United States Patent
Tarng et al.

(10) Patent No.: US 7,642,309 B2
(45) Date of Patent: Jan. 5, 2010

(54) EXTERIOR PAINT FORMULATION

(75) Inventors: Ming-Ren Tarng, Irvine, CA (US); Mark Minamyer, Aliso Viego, CA (US); Anh Pham, Irvine, CA (US); Stan Brownell, Rancho Santa Margarita, CA (US); Annie Pham, Anaheim, CA (US); Anil Alexander, Santa Ana, CA (US); Deven Shah, La Palma, CA (US); Kim L. Nguyen, Santa Ana, CA (US); My Linh Pham, Anaheim, CA (US); Sidney Maxey, Rancho Santa Margarita, CA (US)

(73) Assignee: Behr Process Corporation, Santa Ana, CA (US)

( * ) Notice: Subject to any disclaimer, the term of this patent is extended or adjusted under 35 U.S.C. 154(b) by 436 days.

(21) Appl. No.: 10/914,439

(22) Filed: Aug. 9, 2004

(65) Prior Publication Data

US 2006/0030656 A1   Feb. 9, 2006

(51) Int. Cl.
*C08K 3/22*      (2006.01)
*C08J 3/05*      (2006.01)

(52) U.S. Cl. ............... 524/432; 524/497; 524/501; 524/502

(58) Field of Classification Search ........... 524/501, 524/432, 504
See application file for complete search history.

(56) References Cited

U.S. PATENT DOCUMENTS

| | | | |
|---|---|---|---|
| 4,444,937 A | 4/1984 | Badertscher | |
| 4,771,086 A | 9/1988 | Martin | |
| 4,895,900 A * | 1/1990 | Sukejima et al. | 525/108 |
| 4,927,464 A | 5/1990 | Cowie | |
| 5,338,354 A | 8/1994 | Melville | |
| 5,385,960 A | 1/1995 | Emmons et al. | |
| 5,412,019 A | 5/1995 | Roulstone et al. | |
| 5,534,585 A | 7/1996 | Roulstone et al. | |
| 5,643,592 A | 7/1997 | Jacobson et al. | |
| 5,650,002 A | 7/1997 | Bolt | |
| 5,688,853 A * | 11/1997 | Salter et al. | 524/501 |
| 5,770,310 A | 6/1998 | Noguchi et al. | |
| 5,886,069 A | 3/1999 | Bolt | |
| 5,976,237 A | 11/1999 | Halko et al. | |
| 6,005,044 A | 12/1999 | Karl et al. | |
| 6,040,360 A | 3/2000 | Menovcik et al. | |
| 6,040,913 A | 3/2000 | Johnson | |
| 6,080,800 A | 6/2000 | Frey et al. | |
| 6,080,802 A | 6/2000 | Emmons et al. | |
| 6,086,668 A | 7/2000 | Farneth et al. | |

(Continued)

FOREIGN PATENT DOCUMENTS

EP    0 402 932 A1   12/1990

(Continued)

*Primary Examiner*—Vickey Nerangis
(74) *Attorney, Agent, or Firm*—Foley & Lardner LLP

(57) ABSTRACT

The present invention provides increased stain resistance, tannin blocking, adhesion, and various other properties. A composition in accordance with the principles of the present invention comprises at least two binders, nanoparticle pigment, and pigmentary titanium dioxide. In one embodiment, the present invention relates to a coating on a substrate wherein the coating has two binders, nanoparticle metal oxide pigment, and pigmentary titanium dioxide. Various additives may be included to formulate paint as known in the art.

10 Claims, 5 Drawing Sheets

U.S. PATENT DOCUMENTS

| | | | |
|---|---|---|---|
| 6,143,064 A | 11/2000 | Virtanen | |
| 6,200,375 B1 | 3/2001 | Guez et al. | |
| 6,200,674 B1 | 3/2001 | Kumar et al. | |
| 6,218,012 B1 * | 4/2001 | Rota et al. | 428/402 |
| 6,261,691 B1 | 7/2001 | Atarashi et al. | |
| 6,337,362 B1 | 1/2002 | Reynolds et al. | |
| 6,492,435 B1 * | 12/2002 | Miyamoto et al. | 523/161 |
| 6,576,051 B2 | 6/2003 | Bardman et al. | |
| 6,667,360 B1 * | 12/2003 | Ng et al. | 524/492 |
| 6,727,309 B1 | 4/2004 | Paiva et al. | |
| 6,740,312 B2 | 5/2004 | Chopin et al. | |
| 6,743,286 B2 | 6/2004 | Wen et al. | |
| 2002/0028867 A1 | 3/2002 | Cottis | |
| 2002/0112644 A1 | 8/2002 | Nakamura et al. | |
| 2003/0018103 A1 | 1/2003 | Bardman et al. | |
| 2003/0089278 A1 | 5/2003 | Bettler et al. | |
| 2003/0144399 A1 | 7/2003 | Matta et al. | |
| 2003/0176550 A1 | 9/2003 | Rediske et al. | |
| 2003/0212187 A1 | 11/2003 | Cottis | |
| 2003/0219391 A1 | 11/2003 | Liew et al. | |
| 2004/0068035 A1 | 4/2004 | Paiva et al. | |
| 2007/0221097 A1 * | 9/2007 | Tarng et al. | 106/287.18 |

FOREIGN PATENT DOCUMENTS

| | | |
|---|---|---|
| EP | 0549145 | 6/1993 |
| EP | 0615534 | 4/1997 |
| EP | 0615535 | 5/1998 |
| EP | 0625541 | 3/1999 |

* cited by examiner

EXTERIOR PAINT FORMULATION

FIELD OF THE INVENTION

The present invention relates to polymer resins. More particularly, the present invention relates to paints having a nano-particle based pigment and a plurality of binders.

BACKGROUND OF THE INVENTION

Traditionally consumers have had to choose between the superior durability offered by latex paints and the superior hiding properties of oil-based paint. Conventional latex or emulsion paints require an underlying primer coat prior to their application to provide an adequate level of blocking and to prevent bleed-through, such as of tannins. In addition, many conventional latex paints require a primer coat to provide adequate adhesion and durability for specific applications. Often, even when a primer is applied, multiple coats of the prior art paints are required to prevent an alteration of color due to the presence of the primer or bleed through of dyes and pigments from the underlying substrate. In fact, multiple applications of prior art paint will not prevent bleed-through on substrates such as cedar since the dyes and pigments, such as tannins contained in the substrates, are often water soluble and diffuse through each layer of the latex paint.

Paint typically contains four essential ingredients, namely pigment, binder, liquid and additives. Any or all of these ingredients may be a single component or may comprise multiple items. Pigment provides color to paint and also makes paint opaque, and pigment is usually of mineral or organic origin although some pigments are artificially produced. Some pigments possess little or no bulk and must be fixed on a more solid, but at the same time transparent, substance or base. "Prime" pigments provide color and opacity (opaque coverage). The most common prime pigment is titanium dioxide, which is white and is used in latex and oil-based paints.

Traditionally, pigments have also added hiding properties to paint. Specialty or extender pigments may also be used and provide bulk to the paint at a low cost. The extender pigments are often chosen for their impact on properties like scrub resistance, stain resistance and chalk resistance. Alum or clay are frequently used for this purpose. These pigments are added to the paint to provide certain characteristics such as thickness, a certain level of gloss and durability. They are usually naturally occurring products which originally were in the earth and were mined and purified for use in paint. Such pigments as calcium carbonate, talc and clay are, for example, used extensively in paints.

The binder holds the pigment and also adheres it to a surface, and a binder composition may have more than one component. In latex paint, the latex resin is the binder. Most commonly in latex paint, the binder is 100% acrylic, vinyl acrylic (polyvinyl acetate), or styreneated acrylic. The pigment particles are insoluble and merely form a suspension in the binder. The binder "binds" the pigment into a tough, continuous film and as noted above helps the paint adhere to the surface. In addition, it has been found previously that the use of 100% acrylic binder provides for maximum adhesion when wet and also provides for resistance to blistering and peeling, resistance to mildew and dirt, and alkali resistance for paint applied over fresh masonry.

Liquids carry the pigment and binders, and this liquid is the part of the paint or coatings product which evaporates. The role of the fluid is to keep the paint in a fluid form for ease of application. Once applied to the surface it evaporates leaving a uniform film which then dries to form a protective coating. The liquid used is primarily determined by the solubility of the binder. In oil-based and alkyd paints, the liquid is typically a paint thinner, and in latex paints, the liquid is typically water. Traditionally, top quality paints have less liquid and more solids (i.e. pigment & binders) as measured by percent solid.

Additives are ingredients used at low levels to provide key properties, such as but not limited to: mildew resistance, better flow and leveling, and splatter resistance. Common additives used in conventional paint formulations include rheology modifiers, surfactants, defoamers, coalescents, and biocides. Other numerous additives are well-known in the art and may be utilized as required to formulate a paint having the desired properties.

Various techniques are known in the art for producing paints having various types of sheens, i.e. "shine" or gloss. For example, by incrementally increasing pigment levels and/or by using larger pigment particles, various gloss levels can be achieved including, but not limited to flat, satin, and semi-gloss. Pigment volume concentration (PVC) is often associated with the paint finish, although various finishes may have overlapping ranges of PVC. PVC is the unit volume of pigments as a percentage of the volume of pigments plus the volume of the binder. PVC represents the relationship between durability of the coating and the amount of pigment.

Thus, there is a need for a paint composition and method of making the same to replace the traditional role of a primer and topcoat system and which is capable of providing a coating having improved properties such as, tannin blocking, hiding power, stain removal, and corrosion resistance.

SUMMARY OF THE INVENTION

The present invention relates generally to a binder composition and a paint system with superior tannin blocking, stain removal, corrosion resistance, adhesion, and various other improved properties. The present invention preferably includes a two binder system with an inorganic nano-particle pigment and with a pigmentary titanium dioxide. In one embodiment, a paint composition in accordance with the principles of the present invention further includes additives for formulating paint. In another embodiment, the present invention relates to a coating on a substrate that provides improved coverage through the use of at least two binders, an inorganic nano-particle pigment and a pigmentary titanium dioxide.

DETAILED DESCRIPTION OF THE PREFERRED EMBODIMENTS

Figure 1:
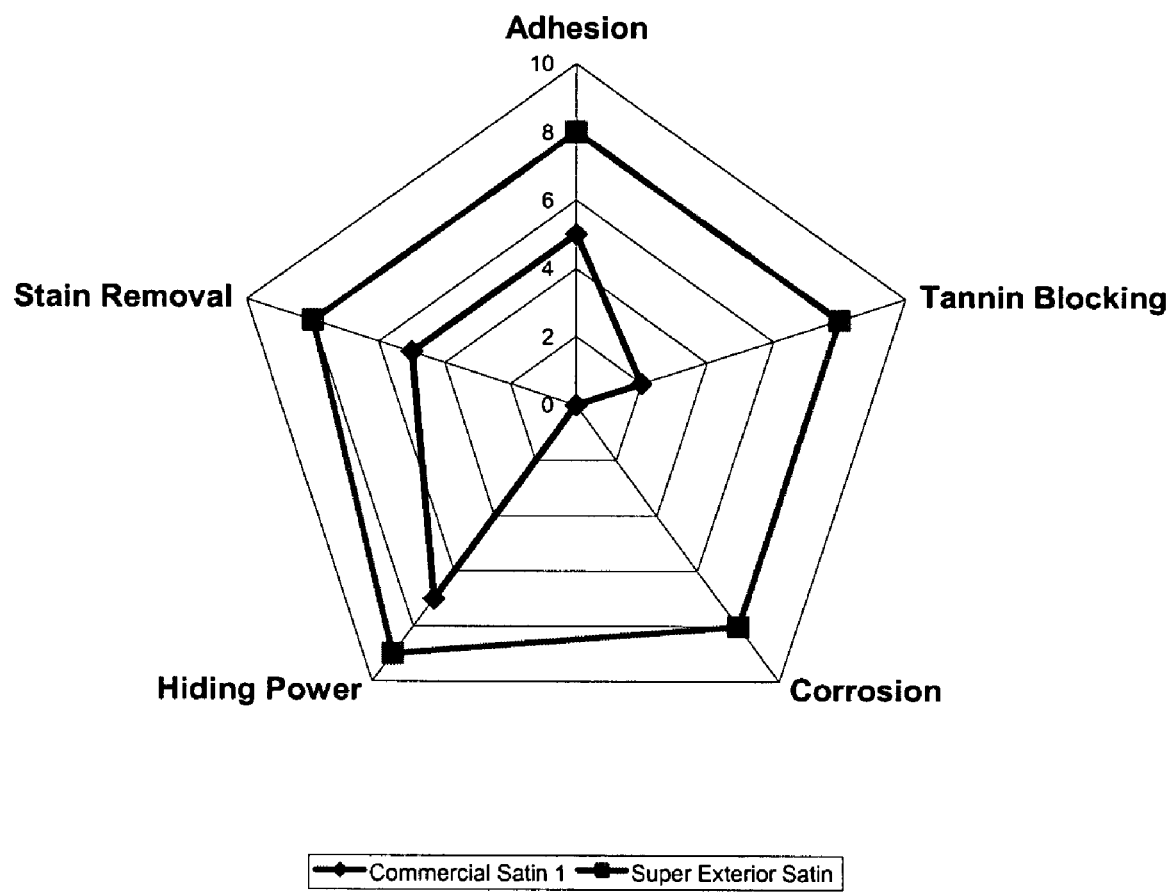
FIG. 1 depicts a multi-axis property graph of the test results of paint of the present invention having a satin sheen and white base, as compared to commercially available exterior satin in a white base.

The present invention is directed in part to a polymer composition within a paint system which replaces the traditional role of a primer and a topcoat with improved properties such as tannin blocking, stain removal, adhesion, and corrosion resistance. In one embodiment, the present invention relates to a composition having a first binder, a second binder, inorganic nanoparticle pigments, and in some cases a third binder. This composition can be used in a conventional paint formulation as known in the art.

Binders for use in the present invention include those prepared by conventionally known methods. Suitable binders include, but are not limited to, 100% acrylic resins and styreneated, acrylic resins as manufactured. Preferably, the first binder is a 100% acrylic resin designed to be used as a primer vehicle, and the second binder is a 100% acrylic resin designed to be used in top coating applications.

Pigments for use in the present invention may comprise any suitable pigments known in the art. In one embodiment, the pigments of the present invention are titanium oxide or zinc oxide but other suitable pigments include nepheline syenite, bentonite, and calcium carbonate. Preferably, the primary pigment is titanium dioxide, such as commercially available pigments.

Metal oxide nanoparticle materials for use in a preferred embodiment of the invention have an average particle size of about 20-150 nanometers, although some embodiments can employ average sizes outside this range. In one preferred embodiment, the nanoparticle material is a zinc oxide material having an average particle size of about 60 nm.

A paint can be prepared in accordance with the principles of the present invention according to a number of known manufacturing methods. Generally, such methods involve the preparation of a binder or a multiple binder system, mixing of the additional ingredients, dispersing of the pigments, and adjusting the density and viscosity to desired levels. A variety of additives and diluents which are well known in the art can be mixed with the binders of the present invention to achieve certain properties in the paint or the coating. The additives may include, but are not limited to, surfactants, defoamers, rheology modifiers, coalescents, biocides, mildewcides, surfactants, and other additives well known in the art.

In one embodiment, a paint in accordance with the principles of the present invention is manufactured to a VOC (Volatile Organic Compounds) of 150 gr/L, including a 37% solid by volume, a 51% solid by weight, a 34 PVC, and a 1.5 pigment/binder ratio.

The PVC of paint in accordance with the principles of a preferred form of the present invention may vary between 4-55 by weight. In one embodiment of the present invention the paint is a "semi-gloss paint", which has a relatively low PVC. In another embodiment of the present invention, the paint is a "satin paint", which has a relatively high PVC. In another embodiment of the present invention, the paint is a "flat paint", which has a relatively high PVC compared to satin paint.

Table 1 lists the general ranges of the main ingredients of a paint in accordance with the principles of a preferred embodiment. The total amount of polymer (i.e., binder) is preferably between about 30-60 gallons per 100 gallons. In one embodiment, the ratio of the first binder to the second binder is about 80:20. The first binder is, in one embodiment, a self-crosslinking polymer. The total amount of pigment, excluding the $TiO_2$, is preferably between about 15 and about 150 pounds per 100 gallons. The $TiO_2$ content is preferably between 0 pounds per gallon and about 360 pounds per 100 gallons. The preservatives comprise between about 5 and about 8 pounds per 100 gallons. Additional additives comprise approximately 50 and approximately 200 pounds per 100 gallons. Water comprises between about 50 and about 200 pounds per 100 gallons. The paint further includes additional solvent, aside from the water content of between about 30 and about 45 pounds per 100 gallons. In one embodiment, the nanoparticle metal oxide pigment particles have an average particle size of less than about 100 nanometers. In a further embodiment, the nanoparticle metal oxide pigment particles have an average particle size of between about 30 nanometers and about 65 nanometers. In one embodiment, the paint composition comprises a first acrylic binder of about 285 pounds per 100 gallons to about 630 pounds per 100 gallons and a second acrylic binder of about 50 pounds per 100 gallons to about 95 pounds per 100 gallons, a third acrylic binder, a first metal oxide comprising pigmentary titanium dioxide; and a second metal oxide comprising a nanoparticle-sized metal oxide pigment of about 2 pounds per 100 gallons to about 20 pounds per 100 gallons, wherein the paint composition has a PVC of about 4 to about 55 and a pigment to binder ratio of about 0.10 to about 3.0.

TABLE 1

Ingredients Range

| Category | Pounds/100 Gallons | |
| --- | --- | --- |
| | Minimum | Maximum |
| Additive | 50.00 | 200.00 |
| Polymer (resin) | 450.00 | 635.00 |
| Pigment | 15.00 | 150.0 |
| Titanium Dioxide | 0.00 | 360.00 |
| Preservative | 5.0 | 8.0 |
| Water | 50.00 | 200.00 |
| Solvent | 0.00 | 45.00 |
| Total | 600 | 1598 |
| Volume % Solids | 25 | 40 |
| Weight % Solids | 30 | 55 |
| PVC | 4 | 55 |

The preferred formulation process consists of two conventional steps: the grind and the letdown. During the grind, the solvent (water), dispersant, defoamer, zinc oxide, ethylene glycol, amino alcohol, nepheline syenite, attapulgite clay are mixed together. During the letdown, the binder, the mildewcide, the rheology modifier, and the biocide, are added to the grind product.

The following non-limiting examples illustrate main components of the paint formulations and the paint formulations themselves. Table 2 provides the material ranges for the components of the paint formulations of Examples 1-4.

TABLE 2

Raw Material Ranges

| Raw Material | Range in lbs/100 gal |
| --- | --- |
| Water | 70-220 |
| Copolymer Dispersant | 10-20 |
| Nano Particle Inorganic Oxide | 4-20 |
| Zinc Oxide | 0-7 |
| Phosphated Co-Ester Surfactant | 3-6 |
| Mineral Oil Defoamer | 4-8 |
| Nepheline Syenite | 10-305 |
| Glycol | 0-35 |
| Rheology Modifier | 15-30 |
| 100% Acrylic Primer Binder | 340-430 |
| 100% Acrylic Topcoat Binder | 70-100 |
| Styrene Acrylic Topcoat Binder | 0-180 |
| Coalescent | 0-15 |

TABLE 2-continued

Raw Material Ranges

| Raw Material | Range in lbs/100 gal |
|---|---|
| In-can Biocide | 0.5-2 |
| Mildewcide | 6-8 |
| Non-ionic Rheology Modifier | 7-25 |
| Amino Alcohol | 0-1 |
| Titanium Dioxide | 0-350 |
| Bentonite | 0-6 |
| Fluoro Surfactant | 0-0.4 |
| Opaque Polymer | 0-110 |
| Attapulgite Clay | 0-8 |
| Non-ionic Surfactant | 0-5 |
| Calcined Diatomaceous | 0-45 |

EXAMPLE 1

Semi-Gloss Finish

Example 1 was formulated using the basic components of Table 2, with the following specific components:

TABLE 3

| Description | Amount | Weight % |
|---|---|---|
| Grind | | |
| Water | 73.92 | 6.98 |
| Copolymer Dispersant | 15.02 | 1.42 |
| Mineral Oil Defoamer | 2.00 | 0.19 |
| Zinc Oxide | 5.00 | 0.47 |
| Nano Particle Metal Oxide | 3.00 | 0.28 |
| Ethylene Glycol | 32.00 | 3.02 |
| Amino Alcohol | 0.50 | 0.05 |
| Non-ionic Surfactant | 4.00 | 0.38 |
| Nepheline Syenite | 10.00 | 0.94 |
| Attapulgite Clay | 5.00 | 0.47 |
| Letdown | | |
| 100% Acrylic Primer Vehicle | 410.65 | 38.77 |
| 100% Acrylic Topcoat Vehicle | 86.44 | 8.16 |
| Mineral Oil Defoamer | 3.00 | 0.28 |
| TiO2 Slurry | 297.00 | 28.04 |
| Coalescent | 8.00 | 0.76 |
| Associative RM | 28.00 | 2.64 |
| Non-ionic HEUR RM | 8.00 | 0.76 |
| Opaque Polymer | 58.80 | 5.55 |
| Phosphated Co-ester Surfactant | 1.00 | 0.09 |
| Mildewcide | 6.94 | 0.65 |
| In-can Biocide | 1.00 | 0.09 |

EXAMPLE 2

Satin Finish

Example 2 was formulated using the basic components of Table 2, with the following specific components:

TABLE 4

| | Amount | Weight % |
|---|---|---|
| Grind | | |
| Water | 45.35 | 4.06 |
| Copolymer Dispersant | 15.02 | 1.35 |
| Mineral Oil Defoamer | 3.00 | 0.27 |
| Nano Particle Metal Oxide | 15.00 | 1.34 |
| Ethylene Glycol | 37.00 | 3.32 |
| Amino Alcohol | 0.50 | 0.04 |

TABLE 4-continued

| | Amount | Weight % |
|---|---|---|
| Non-ionic Surfactant | 2.00 | 0.18 |
| Nepheline Syenite | 105.02 | 9.41 |
| Attapulgite Clay | 5.01 | 0.45 |
| Letdown | | |
| 100% Acrylic Primer Vehicle | 410.60 | 36.82 |
| 100% Acrylic Topcoat Vehicle | 86.43 | 7.75 |
| TiO2 Slurry | 294.32 | 26.39 |
| Coalescent | 8.00 | 0.72 |
| Phosphated Co-ester Surfactant | 1.00 | 0.09 |
| Associative RM | 25.00 | 2.24 |
| Non-ionic HEUR RM | 4.00 | 0.36 |
| Opaque Polymer | 50.05 | 4.49 |
| Mildewcide | 6.94 | 0.62 |
| In-can Biocide | 1.00 | 0.09 |

EXAMPLE 3

Flat Finish

Example 3 was formulated using the basic components of Table 2, with the following specific components:

TABLE 5

| | Amount | Weight % |
|---|---|---|
| Grind | | |
| Water | 25.27 | 2.18 |
| Ethylene Glycol | 22.55 | 1.95 |
| Non-ionic Surfactant | 2.00 | 0.17 |
| Copolymer Dispersant | 15.3 | 1.32 |
| Zinc Oxide | 4.92 | 0.42 |
| Nano Particle Metal Oxide | 4.92 | 0.43 |
| Amino Alcohol | 0.98 | 0.09 |
| Mineral Oil Defoamer | 1.97 | 0.17 |
| Nepheline Syenite | 94.7 | 8.18 |
| Attapulgite Clay | 7.92 | 0.68 |
| Phosphated Co-ester Surfactant | 3.87 | 0.33 |
| Letdown | | |
| TiO2 Slurry | 350.02 | 30.26 |
| Water | 82.22 | 7.1 |
| Calcined Diatomaceous Earth | 44.28 | 3.82 |
| 100% Acrylic Primer Vehicle | 285.04 | 24.64 |
| 100% Acrylic Topcoat Vehicle | 60.02 | 5.19 |
| Opaque | 105.79 | 9.15 |
| Coalescent | 7.87 | 0.68 |
| Associative RM | 18.81 | 1.63 |
| Mildewcide | 6.82 | 0.59 |
| Mineral Oil Defoamer | 3.94 | 0.34 |
| Non-ionic HEUR RM | 6.43 | 0.56 |
| In-can Biocide | 0.96 | 0.08 |

EXAMPLE 4

Flat Finish

Example 4 was formulated using the basic components of Table 2, with the following specific components:

TABLE 6

| | Amount | Weight % |
|---|---|---|
| Grind | | |
| Water | 197 | 21.15 |
| Ethylene Glycol | 30 | 3.22 |

TABLE 6-continued

|  | Amount | Weight % |
|---|---|---|
| Non-ionic Surfactant | 1.00 | 0.85 |
| Copolymer Dispersant | 8.0 | 0.86 |
| Nano Particle Metal Oxide | 8.0 | 0.86 |
| Mineral Oil Defoamer | 6.0 | 0.64 |
| Nepheline Syenite | 90.0 | 9.64 |
| Bentonite | 6.0 | 0.64 |
| Letdown | | |
| Opaque | 4.0 | .43 |
| 100% Acrylic Primer Vehicle | 366.0 | 39.3 |
| 100% Acrylic Topcoat Vehicle | 77.0 | 8.27 |
| $2^{nd}$ Acrylic Topcoat Vehicle | 82.0 | 8.8 |
| Coalescent | 5.0 | 0.54 |
| Associative RM | 18.0 | 1.9 |
| Mildewcide | 6.92 | 0.74 |
| Non-ionic HEUR RM | 25 | 2.68 |
| In-can Biocide | 1.0 | 0.1 |

Adhesion Testes

Various adhesion tests were performed to determine the adhesion properties of a paint in accordance with the principles of the present invention on different substances. The results of the tests compare a paint of the present invention to a typical, commercially-available paint and primer system sold for exterior use, and these tests are presented in Table 7.

TABLE 7

Adhesion Test Results Rated by ASTM D3359

| Adhesion Test | Test Condition | Paint Formulation of the present invention | Acrylic Exterior Primer* (Control) | Acrylic Exterior Topcoat* (Control) |
|---|---|---|---|---|
| Alkyd | | | | |
| green | overnight, dry/wet | 5B/4B | 5B/4B | 5B/5B |
| gray | overnight, dry/wet | 5B/5B | 5B/5B | 5B/5B |
| Chalk | | | | |
| blue latex panel | overnight, dry/wet | 5B/5B | 5B/4B | 5B/5B |
| Wood | | | | |
| Cedar | overnight, dry/wet | 4B/5B | 3B/3B | 4B/5B |
| Oak | overnight, dry/wet | 5B/5B | 5B/4B | 5B/5B |
| Redwood | overnight, dry/wet | 5B/5B | 5B/4B | 5B/5B |
| PT green | overnight, dry/wet | 5B/5B | 5B/5B | 5B/5B |
| Vinyl Siding | | | | |
| new vinyl | overnight, dry/wet | 5B/5B | 5B/5B | 5B/5B |
| weathered vinyl | overnight, dry/wet | 5B/5B | 5B/5B | 5B/5B |
| Metals | | | | |
| galvanized steel | overnight, dry/wet | 4B/5B | 3B/3B | 0B/0B |
|  | 3 day, dry/wet | 5B/3B | 4B/4B | 0B/0B |
| aluminum roll | overnight, dry/wet | 2B/3B | 3B/3B | 0B/0B |
|  | 3 day, dry/wet | 4B/5B | 4B/4B | 0B/0B |
| Miscellaneous | | | | |
| glossy black tile | overnight, dry/wet | 5B/3B | 2B/0B | 0B/0B |
|  | 3 day, dry/wet | 5B/5B | 5B/2B | 0B/0B |
| clay tile | overnight, dry/wet | 5B/3B | 1B/0B | 1B/0B |
|  | 3 day, dry/wet | 5B/5B | 5B/5B | 3B/0B |

TABLE 7-continued

Adhesion Test Results Rated by ASTM D3359

| Adhesion Test | Test Condition | Paint Formulation of the present invention | Acrylic Exterior Primer* (Control) | Acrylic Exterior Topcoat* (Control) |
|---|---|---|---|---|
| bull nose brick | overnight, dry/wet | 5B/0B | 4B/0B | 4B/0B |
|  | 3 day, dry/wet | 5B/0B | 5B/0B | 2B/0B |

*The control Acrylic Exterior Primer and Control Acrylic Exterior Topcoat tested were at least comparable to those readily available on the commercial market.

In addition, a battery of tests were performed to evaluate the overall performance of a paint in accordance with the principles of the present invention at various sheens as compared to paints currently available in the marketplace. As shown in the results in Tables 8 and 9, the paint prepared in accordance with the principles of the present invention outperformed all of the other paints in the respective category.

TABLE 8

Flat Sheen Benchmarking Composite Scores

| Test | Super Exterior Flat | Commercial Acrylic Flat** | Possible Score |
|---|---|---|---|
| Freeze-Thaw | 1 | 0 | 2 |
| Heat Stability | 1.5 | 3 | 3 |
| Applied Holding | 7.5 | 5 | 10 |
| Leveling | 5 | 0 | 5 |
| Touch-up | 7.5 | 10 | 10 |
| Drying Time | 2 | 2 | 2 |
| Sag Resistance | 3 | 3 | 3 |
| Roller Foam | 3 | 3 | 3 |
| Roller Spatter | 1 | 0.5 | 1 |
| 3 mil Contrast Ratio | 20 | 6 | 20 |
| Dry Adhesion | 12 | 7.5 | 15 |
| Blistering Resistance | 9 | 9 | 9 |
| Wet Adhesion | 15 | 15 | 15 |
| Water Spotting | 2 | 2 | 2 |
| Total Score | 89.5 | 66 | 100 |

**The Commercial Acrylic Flat paint tested was at least comparable to those readily available on the commercial market.

As seen in Table 9, the satin sheen of the present invention exhibits improved leveling, roller foam, contrast, and dry adhesion.

TABLE 9

Satin Sheen Benchmarking Composite Scores

| Test | Super Exterior Satin | Commercial Acrylic Exterior Satin*** | Commercial Silicone Acrylic Exterior Satin*** | Possible Score |
|---|---|---|---|---|
| Freeze-Thaw | 2 | 1 | 2 | 2 |
| Heat Stability | 3 | 3 | 3 | 3 |
| Applied Holding | 10 | 5 | 10 | 10 |
| Leveling | 5 | 2.5 | 0 | 5 |
| Touch-up | 7.5 | 4 | 7.5 | 10 |
| Drying Time | 2 | 2 | 2 | 2 |
| Sag Resistance | 3 | 3 | 3 | 3 |
| Roller Foam | 3 | 3 | 1.5 | 3 |
| Roller Spatter | 1 | 1 | 1 | 1 |
| 3 mil Contrast Ratio | 20 | 20 | 14 | 20 |

TABLE 9-continued

Satin Sheen Benchmarking Composite Scores

| Test | Super Exterior Satin | Commercial Acrylic Exterior Satin*** | Commercial Silicone Acrylic Exterior Satin*** | Possible Score |
|---|---|---|---|---|
| Dry Adhesion | 12 | 0 | 12 | 15 |
| Blistering Resistance | 15 | 7 | 15 | 9 |
| Wet Adhesion | 9 | 15 | 9 | 15 |
| Water Spotting | 2 | 2 | 2 | 2 |
| Total Score | 94.5 | 68.5 | 82 | 100 |

***The Commercial Acrylic Satin Exterior and Commercial Silicone Acrylic Exterior Satin tested were at least comparable to those readily available on the commercial market.

Figure 2:
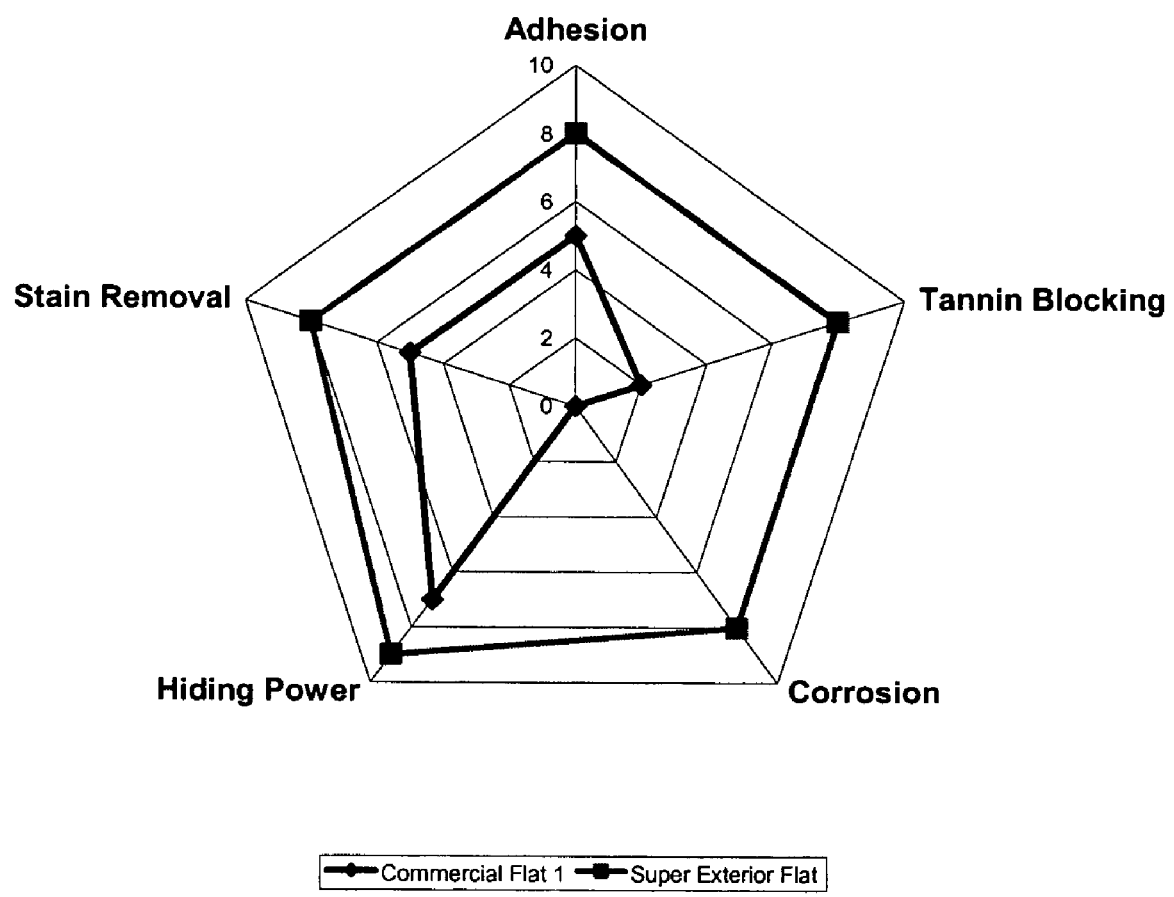
FIG. 2 depicts a multi-axis property graph of the test results of flat white base paint in accordance with the principles of the present invention, as compared to a commercially available exterior flat paint in a white base.
Figure 3:
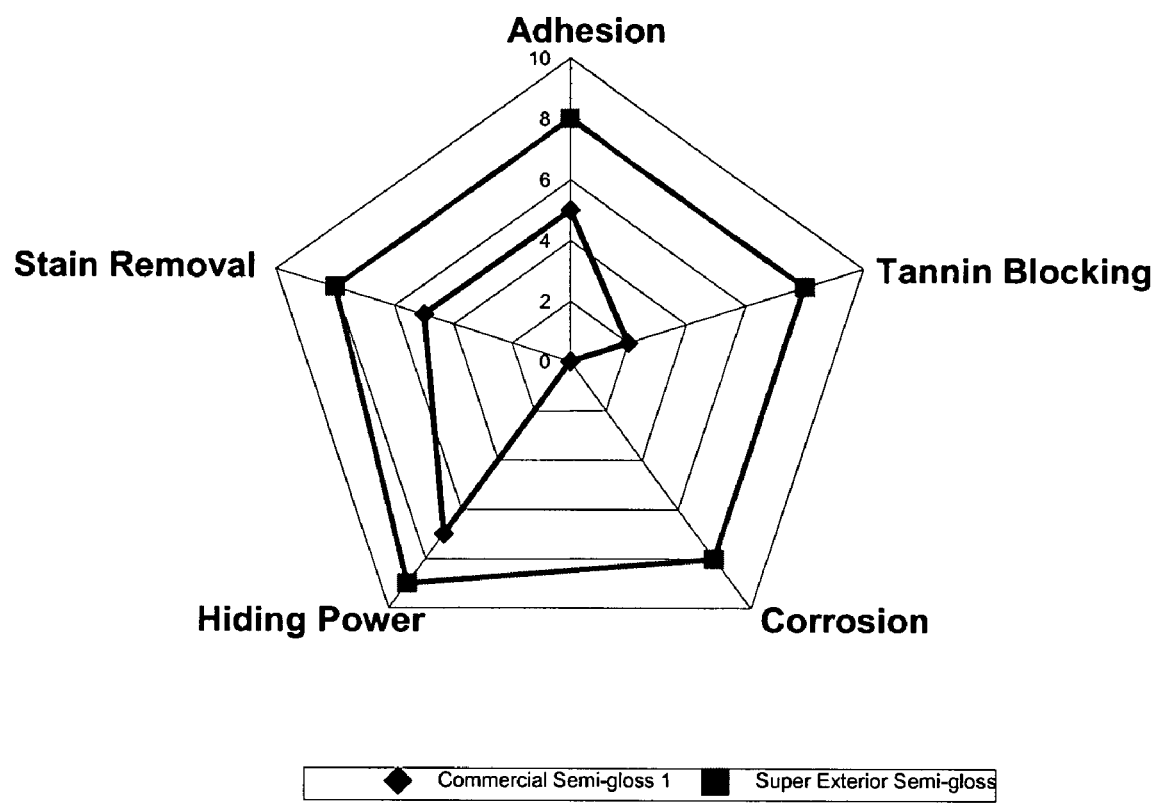
FIG. 3 illustrates a multi-axis property graph of the test results for semi-gloss white base paint of the present invention versus a commercially-available, exterior semi-gloss paint in a white base.
Figure 4:
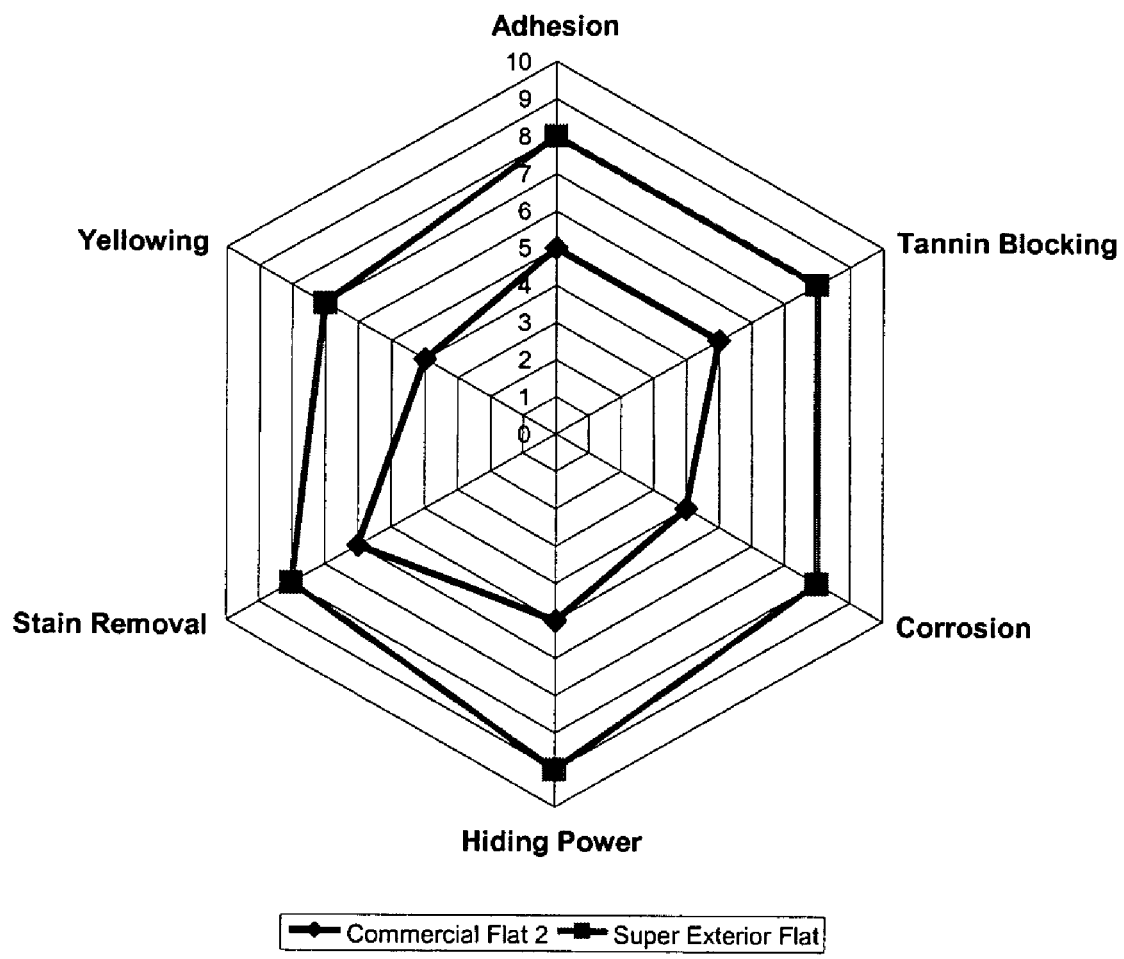
FIG. 4 illustrates a multi-axis property graph for a flat white base paint of the present invention versus a second commercially available exterior flat paint in a white base.
Figure 5:
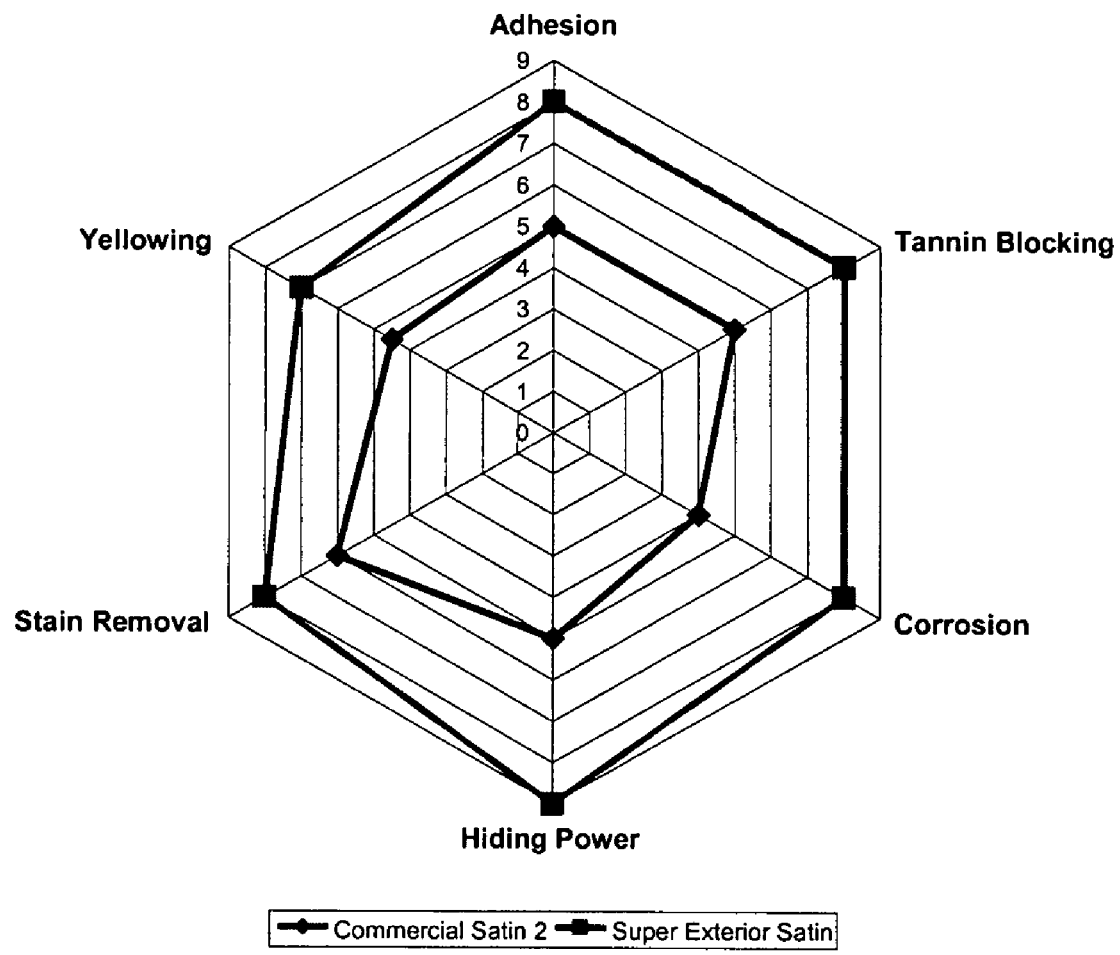
FIG. 5 illustrates a multi-axis property graph for a satin white base paint of the present invention versus a second commercially-available, exterior satin paint in a white base.

As illustrated in FIGS. 1, 2, 3, 4, and 5, paint prepared in accordance with the principles of the present invention exhibits improvements in adhesion, tannin blocking, stain removal, hiding power, and corrosion resistance. FIG. 1 depicts a multi-axis property graph of the test results of paint of the present invention having a satin sheen and white base, as compared to commercially-available, exterior satin in a white base. Adhesion, yellowing, stain removal, hiding power, scrub resistance, corrosion, and tannin blocking were measured. FIG. 2 depicts a multi-axis property graph of the test results of flat white base paint in accordance with the principles of the present invention, as compared to a commercially available exterior flat paint in a white base. FIG. 3 illustrates a multi-axis property graph of the test results for semi-gloss white base paint of the present invention versus a commercially available exterior semi-gloss paint in a white base. All properties were improved in formulations in accordance with the principles of the present invention with the exception of scrub resistance and yellowing, which showed a reduction. FIG. 4 illustrates a multi-axis property graph for a flat white base paint of the present invention versus a second commercially-available, exterior flat paint in a white base. All properties were improved in formulations in accordance with the principles of the present invention. FIG. 5 illustrates a multi-axis property graph for a satin white base paint of the present invention verses a second commercially-available, exterior satin paint in a white base. All properties were improved in formulations in accordance with the principles of the present invention.

While several embodiments have been shown and described in this application, it is understood that changes and modifications can be made to the invention without departing from the invention's broader aspects.

What is claimed is:

1. A paint composition comprising:
    a first acrylic primer binder of about 285 pounds per 100 gallons to about 630 pounds per 100 gallons;
    a second acrylic topcoat binder of about 50 pounds per 100 gallons to about 95 pounds per 100 gallons;
    a third acrylic binder of greater than 0 and up to 180 pounds per 100 gallons, the third acrylic binder consisting of a styrene acrylic binder;
    a first metal oxide comprising pigmentary titanium dioxide; and
    a second metal oxide comprising a nanoparticle-sized metal oxide pigment of about 2 pounds per 100 gallons to about 20 pounds per 100 gallons,
    wherein the paint composition has a PVC of about 4 to about 55 and a pigment to binder ratio of about 0.10 to about 3.0.

2. The composition of claim 1, wherein the nanoparticle-sized metal oxide pigment comprises zinc oxide.

3. The composition of claim 1, wherein the nanoparticle-sized metal oxide pigment comprises particles having an average particle size of less than about 100 nanometers.

4. The composition of claim 3, wherein the nanoparticle-sized metal oxide pigment comprises particles having an average particle size of between about 30 nanometers and about 65 nanometers.

5. The composition of claim 1, wherein the first acrylic primer binder consists essentially of acrylic.

6. The composition of claim 1, wherein the second acrylic topcoat binder consists essentially of acrylic.

7. The composition of claim 1, wherein the first acrylic primer binder comprises self-crosslinking polymer.

8. The composition of claim 1, wherein the first acrylic binder comprises a 100% acrylic binder intended for use as a primer vehicle.

9. The composition of claim 1, wherein the ratio of the first primer binder to the second topcoat binder is about 80:20.

10. A paint composition comprising:
    an acrylic primer binder in an amount of 340 to 430 lbs per 100 gallons of paint;
    an acrylic topcoat binder in an amount of 70 to about 100 lbs per 100 gallons of paint;
    a styrene acrylic topcoat binder in an amount greater than 0 to 180 lbs per 100 gallons of paint;
    titanium dioxide in an amount greater than 0 to 350 lbs per 100 gallons of paint;
    zinc oxide in an amount greater than 0 to 7 lbs per 100 gallons of paint; and
    a nano particle inorganic oxide in an amount 4 to 20 lbs per 100 gallons of paint.

* * * * *

UNITED STATES PATENT AND TRADEMARK OFFICE
CERTIFICATE OF CORRECTION

PATENT NO. : 7,642,309 B2  
APPLICATION NO. : 10/914439  
DATED : January 5, 2010  
INVENTOR(S) : Tarng et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 924 days.

Signed and Sealed this

Sixteenth Day of November, 2010

David J. Kappos  
*Director of the United States Patent and Trademark Office*